United States Patent Office 2,974,075

Patented Mar. 7, 1961

2,974,075

TREATMENT OF SEMICONDUCTIVE DEVICES

Lewis E. Miller, Fullerton, Pa., assignor to Bell Telephone Laboratories, Incorporated, New York, N.Y., a corporation of New York

No Drawing. Filed Oct. 28, 1957, Ser. No. 692,550

5 Claims. (Cl. 148—6.3)

This invention relates to processes for treating semiconductive devices which include a rectifying junction. These processes are particularly applicable to devices made of germanium, silicon, or alloys thereof.

In the operation of semiconductive devices such as transistors, the characteristics of high current amplification and low reverse saturation current are of the essence. Current amplification in a junction transistor is the ratio of the number of injected minority carriers which reach the collector to the total number of minority carriers injected into the base zone from the emitter. Reverse saturation current is the current which flows from collector to base at a specified reverse bias and a specified emitter to base current. In the discussion below, the notations $\alpha(A, B)$ and $I_{CB}(A, B)$ are used to designate the current amplification $\alpha$ and the reverse saturation current $I_{CB}$, where A is the emitter to base current and B is the collector voltage with respect to the base for the particular $\alpha$ or $I_{CB}$ measured. In the operation of semiconductive devices such as rectifiers, the characteristic of low reverse current is one of the most important in determining the utility of a particular device.

It has been discovered that treating the surface of a semiconductive device, which includes a rectifying junction, in accordance with this invention effectively reduces the reverse saturation current of the device and effectively increases the current amplification. In essence, the process of this invention comprises the steps of treating a semiconductive device with an aqueous solution of hydrogen peroxide followed by baking in an atmosphere containing oxygen.

In an illustrative example of this invention an alloy germanium transistor, fabricated by alloying indium-lead alloy pellets into the opposing broad faces of an n-type germanium wafer, was wetted with a 30% aqueous solution of hydrogen peroxide at room temperature and thereafter baked in oxygen at 100° C. for a period of 16 hours. The device before treatment in accordance with this invention had a reverse saturation current $[I_{cb}(0,-20)]$ of 15 microamperes and a current amplification factor $[\alpha(1,-5)]$ of .920. After treatment the reverse saturation current was reduced to 2.3 microamperes and the current amplification increased to .950.

It has been determined that the concentration of hydrogen peroxide used in the process of this invention is not critical. Whereas a 30% solution by weight is desirable by reason of ease of handling and ready availability, effectiveness is substantially impaired only at concentrations below approximately 10%. Increasing the concentration above 30% does not impair the effectiveness of the process and the upper limit is determined only by practical considerations.

The preferred minimum temperature for the oxygen bake in accordance with the principles of this invention is 100° C., since at this temperature most of the water is removed from the wafer thus eliminating a subsequent drying step prior to encapsulation. A lower temperature can be used with an increase in baking time as required from the standpoint of the kinetics of the reaction. There does not appear to be any advantage gained by using a temperature above 100° C. The maximum temperature which can be used in a particular case is dependent upon two factors, the melting points of the alloys used to fabricate the device and the temperatures at which the diffusivities of the significant impurities included in the device become appreciable. This latter limit is considered to be approxmately 800° C. for silicon and approximately 500° C. for germanium. However, since the highest eutectic temperatures of alloys of germanium or silicon with metals commonly used in the art for the manufacture of such devices are lower than the limits set by consideration of the diffusivities, the limit for practical purposes is set by the lowest melting alloy used in the fabrication of the particular device.

The baking step can be practiced in an atmosphere with a low oxygen content. Air has been successfully used. It does not appear that the partial pressure of oxygen in the atmosphere is a critical parameter since equivalent results have been obtained in air and pure oxygen.

The minimum length of time for the making step conducted at 100° C. in air is approximately fifteen minutes. A time of one hour is preferred since it has been found that this length of time produces devices which are dry enough to be encapsulated without further treatment. Baking times longer than one hour do not produce devices with reverse saturation currents which are lower than those of devices baked for one hour, and therefore longer baking does not appear to be advantageous in this respect. Variation in the strength of the hydrogen peroxide solution or in the percentage of oxygen in the baking atmosphere, within the limits set forth above, does not require an increase in the minimum baking time.

Minute quantities of inorganic salts may be formed on the surface of the device during the baking step in accordance with the present invention. It is hypothesized that the salts are formed from impurities in the hydrogen peroxide. It has been found desirable to rinse the devices in deionized water during or after baking to remove these salts. If such is done, a subsequent drying step is necessary. The presence of the salts is not harmful as long as moisture is rigorously excluded from the encapsulated transistor. However, an electrically conductive solution may form thereby producing deleterious surface effects.

In the treatment of alloy junction transistors in accordance with this invention, it has been determined that the average over-all electrical characteristics are improved still further if a short treatment in an etchant which includes hydrofluoric acid and nitric acid is used prior to the peroxide dip.

It is hypothesized that the advantages obtained by the practice of this invention are due to changes in the surface of a semiconductive body so treated. In particular, it is believed that the reverse saturation current is reduced by removing or rendering inert surface imperfections in the vicinity of the rectifying junction. Such imperfections cause a breakdown of the junction at the surface at voltages much lower than those at which breakdown occurs across the junction in the interior of the device, thereby giving rise to high reverse currents at relatively low reverse bias voltages. Furthermore, the process of this invention reduces the surface recombination velocity of a device thereby increasing the over-all current amplification.

Although this process appears to involve a mild oxidation of the surface of a device so treated it has been determined that the particular processing steps of this invention are unique in causing the improvements set forth above. Thus it has been determined that neither a dip in hydrogen peroxide alone nor an oxygen baking step alone produce results commensurate wtih those obtained by the practice of this invention.

The present invention may be practiced with equally advantageous results on all types of devices fabricated from germanium including devices produced by diffusion techniques. Furthermore, the processes of this invention are equally suited to the improvement of silicon devices.

Described below are specific examples of the application of the principles of the present invention. It is understood that these examples are intended merely as illustrative and that variations in parameters and materials in accordance with the requirements set forth above made by a worker skilled in the art are deemed to be within the spirit and scope of this invention.

In the following examples the p-n-p germanium transistor treated was produced by alloying a lead-indium pellet to each of the two broad faces of an n-type wafer. Wire electrodes of nickel were attached to the p-type emitter and collector, and the n-type wafer was fused to an antimony-coated base plate during the alloying step. The n-p-n transistor treated was fabricated using lead-arsenic alloy pellets and a gold-coated base plate.

*Example 1*

A p-n-p alloy germanium transistor was dipped into a 30% aqueous solution of hydrogen peroxide, and heated at 100° C. in oxygen at atmospheric pressure for a period of sixteen hours.

The transistor had a reverse saturation current $I_{CB}$ (0,—20) of 2.5 microamperes and a current amplification factor $\alpha$ (1,—5) of .98 after treatment as compared to an $I_{CB}$ of 95 microamperes and an $\alpha$ of .95 prior to this treatment.

*Example 2*

A p-n-p alloy germanium transistor was dipped into a 30% aqueous solution of hydrogen peroxide, and heated at 100° C. in air at atmospheric presure for a period of one hour.

The transistor had a reverse saturation current $I_{CB}$ (0.—20) of 2.7 microamperes and a current amplification factor $\alpha$ (1,—5) of .97 after treatment as compared to an $I_{CB}$ of 44 microamperes and an $\alpha$ of .94 prior to this treatment.

*Example 3*

A p-n-p alloy germanium transistor was dipped into a 10% aqueous solution of hydrogen peroxide and was then baked under an oxygen atmosphere at 100° C. for one hour.

The transistor had a reverse saturation current $I_{CB}$ (0,—20) of 2.6 microamperes and a current amplification factor $\alpha$ (1,—5) of .985 after treatment as compared to an $I_{CB}$ of 70 microamperes and an $\alpha$ of .96 prior to this treatment.

*Example 4*

A p-n-p allow germanium transistor was treated for five seconds in a solution comprising equal parts of 48% hydrofluoric acid and 70% nitric acid, and then rinsed in deionized water. The transistor was then dipped in a 30% aqueous solution of hydrogen peroxide and baked in oxygen at atmospheric pressure for four hours at 100° C. The transistor was then rinsed in deionized water for a period of fifteen minutes and baked under the same conditions as before to dryness.

The transistor had a reverse saturation current $I_{CB}$ (0,—20) of 3.2 microamperes and a current amplification factor $\alpha$ (1,—5) of .982 after treatment as compared to an $I_{CB}$ of 100 microamperes and an $\alpha$ of .955 prior to this treatment.

*Example 5*

An n-p-n alloy germanium transistor was treated for two seconds in a solution comprising three parts of 48% hydrofluoric acid and one part 70% nitric acid, and then rinsed in deionized water. The transistor was then dipped in a 30% aqueous solution of hydrogen peroxide and baked in oxygen at atmospheric pressure for sixteen hours at 100° C.

The transistor had a reverse saturation current $I_{CB}$ (0,+20) of 3.8 microamperes and a current amplification factor $\alpha$ (—1,5) of .95 after treatment as compared to an $I_{CB}$ of 340 microamperes and an $\alpha$ of .93 prior to this treatment.

*Example 6*

A p-n-p alloy germanium transistor was dipped into a 30% aqueous solution of hydrogen peroxide and heated at 100° C. in air at atmospheric pressure for a period of fifteen minutes.

The transistor had a reverse saturation current $I_{CB}$ (0,—20) of 5.5 microamperes and a current amplification factor $\alpha$ (1,—5) of .965 after treatment as compared to an $I_{CB}$ of 70 microamperes and an $\alpha$ of .95 prior to this treatment.

What is claimed is:

1. A process of treating the surface of a semiconductive body consisting of a material selected from the group consisting of germanium, silicon and germanium-silicon alloys which consists essentially of wetting said body with a solution consisting essentially of hydrogen peroxide and water and heating said wetted body having said hydrogen peroxide retained thereon in an atmosphere containing oxygen which is independent of any oxygen which may be derived from said hydrogen peroxide to a temperature of at least approximately 100° C. and below the melting point of the lowest melting component of the body and maintaining said body in contact with said atmosphere at said temperature.

2. The process of claim 1 wherein the body is maintained in contact with air.

3. The process of claim 1 including pretreating said device with a solution comprising hydrofluoric acid and nitric acid and rinsing in deionized water.

4. The process of claim 2 wherein the period of contact is at least 15 minutes.

5. The process of claim 2 wherein the semiconductive body is germanium and the temperature is between 100° C. and 500° C.

References Cited in the file of this patent

UNITED STATES PATENTS

| | | |
|---|---|---|
| 2,542,727 | Theuerer | Feb. 20, 1951 |
| 2,577,803 | Pfann | Dec. 11, 1951 |
| 2,739,882 | Ellis | Mar. 27, 1956 |
| 2,748,325 | Jenny | May 29, 1956 |
| 2,819,192 | Young | Jan. 7, 1958 |